United States Patent Office 3,297,792
Patented Jan. 10, 1967

3,297,792
BLENDS OF (1) GRAFT COPOLYMER OF VINYL CHLORIDE ONTO CHLORINATED POLYOLEFIN, (2) DIENE-NITRILE RUBBER AND (3) ETHYLENE-VINYL ACETATE COPOLYMER
Antony William M. Coaker, Wilbraham, Oscar P. Cohen, Longmeadow, and John W. Ryan, Northampton, Mass., assignors to Monsanto Company, a corporation of Delaware
No Drawing. Filed Mar. 4, 1964, Ser. No. 349,489
12 Claims. (Cl. 260—876)

The present invention relates generally to a multicomponent blend of thermoplastic polymeric materials and more specifically to a novel multicomponent blend of an improved vinyl chloride graft copolymer plastified with an ethylene-vinyl acetate copolymer and a low-nerve type rubbery copolymer of acrylonitrile and a conjugated diene.

Conventional semi-rigid polymeric thermoplastic materials such as plasticized polyvinyl chloride, polypropylene, linear polyethylene, polytetrafluoroethylene, certain styrene-acrylonitrile butadiene terpolymeric blends, and polyvinylidene chloride suffer from poor combinations of properties, making them commercially unattractive for many uses. For example, polypropylene, linear polyethylene, cellulose acetate, and styrene-acrylonitrile-butadiene terpolymers are found to support combustion. Obviously, a self-extinguishing or nonburning material is preferred for most applications. Polytetrafluoroethylene, on the other hand, is nonflammable but high in cost. For outdoor applications requiring resistance to sunlight, polypropylene, and linear polyethylene require black pigmentation, cellulose acetate, propionate, and acetate butyrate discolor slowly, while styrene-acrylonitrile butadiene terpolymer blends and polyvinylidene chloride slowly suffer degradation of their physical properties and discoloration. Polytetrafluoroethylene while resistant to sunlight, is expensive and difficult to fabricate into useful articles. Conventional plasticized polyvinyl chloride, formulated for semi-rigid properties at the standard laboratory temperature of 23° C. has poor impact resistance at normal and subnormal temperatures. Ketones, esters, and alcohols generally dissolve or swell the cellulose derivatives, while ketone esters and chlorinated hydrocarbons attack styrene-acrylonitrile-butadiene terpolymers. Aromatic hydrocarbons dissolve or swell, polypropylene and linear polyethylene and generally swell and extract the liquid plasticizer from conventional plasticized polyvinyl chloride. Strong and oxidizing acids decompose cellulose derivatives and slowly attack polypropylene, linear polyethylene, and styrene-acrylonitrile-butadiene terpolymer blends.

Vinyl chloride polymers elasticated with macromolecular products such as chloroprene, butadiene-acrylonitrile, butadiene-styrene, and chlorinated and chlorosulfonated polyolefins though found to be useful in applications requiring good impact strength, generally acquire impact strength only at the expense of sacrificing one or more of the desirable properties of rigidity, clarity, tensile strength, solvent resistance, high heat distortion point, and chemical resistance. Additionally, mechanical mixtures of polyvinyl chloride and polyethylene are incompatible under certain circumstances, tending to produce blends lacking in homogeneity.

No single rigid or semi-rigid polymeric blend enjoys a desirable combination of low cost, ease of fabrication in conventional thermoplastic processing equipment, insolubility, resistance to sunlight and prolonged heat, freedom from fungaceous and bacterial attack, a relatively flat flexural modulus versus temperature curve (giving a wide use-temperature range with rigidity at the desired level), resistance to chemical attack, high impact strength over a wide temperature range, good electrical and thermal insulating and dielectric properties, etc.

Correspondingly, no single flexible thermoplastic blend dominates the field by having an overall desirable combination of properties since one or more of the same general types of deficiencies are found in conventional, natural, and synthetic flexible, and/or leathery thermoplastic materials.

It is therefore an object of this invention to provide improved multicomponent blends of polymeric materials which, together with suitable additives provide superior semi-rigid and flexible thermoplastic compositions for use in exacting service where, to be desirable, a material must combine numerous specific properties.

It is a further object of this invention to provide lower cost compositions which satisfy complex use requirements in service heretofore requiring the specification of only the more expensive semi-rigid or flexible polymeric materials, or those which are particularly difficult to fabricate into useful objects.

It is a still further object of this invention to provide a multicomponent blend of an ethylene-vinyl acetate copolymer, a rubberlike copolymer of acrylonitrile and a conjugated diene, and a graft copolymer prepared by polymerizing a monomeric material comprising principally vinyl chloride with a chlorinated polyolefin.

It is a further object of this invention to provide a process for preparing a multicomponent blend of thermoplastic polymeric materials useful in the production of low cost flexible and semi-rigid products comprising the steps of preparing a graft copolymer of a monomeric material such as vinyl chloride with a chlorinated polyolefin and blending the resultant graft blend with a rubberlike copolymer of acrylonitrile and a conjugated diene, together with an ethylene-vinyl acetate copolymer.

It is a further object of this invention to provide the art with a novel composition useful in the production of flexible and semi-rigid compositions for pipes, containers, wire and cable insulation, film and sheeting for electrical and pressure-sensitive tape, dry-cleanable and washable garments, flame resistant insulation facings, etc.

Each of the above objects of this invention has been realized through the development of a novel series of graft copolymers composed of pendant vinyl chloride chains polymerized onto a rubbery backbone of a chlorinated polyolefin or chlorosulfonated polyolefin. The graft copolymers formed in the practice of the present invention, described and claimed in copending U.S. application Serial No. 204,031, filed June 21, 1962, are those wherein 2–40 percent by weight of a chlorinated polyolefin having a chlorine content of 15–49 percent by weight is graft polymerized with 69–98 percent by weight of monomeric material comprising at least 80 percent by weight of vinyl chloride with up to 20 percent of other ethylenically unsaturated monomers copolymerizable therewith, such as vinylidene chloride, vinyl esters of organic acids, acrylonitrile, acrylates, methacrylates, maleates, fumarates, ethylene, propylene, vinyl fluoride, vinyl bromide, divinyl benzene, divinyl phthalate, diallyl maleate, and other unsaturated organic compounds. The rubbery backbone of the copolymer is preferably obtained by the chlorination or chlorosulfonation of high polymeric hydrocarbons such as polyethylene, polypropylene, etc. The copolymers found to be particualrly suitable are the chlorinated or chlorosulfonated products of low pressure olefins, although good results have often been obtained with products of the high pressure polymerization processes. For optimum performance, the olefins should be uniformly chlorinated or chlorosulfonated, and should have a number average molecular weight of from about 10,000 to 100,000 and more preferably from 14,000 to 45,000. The chlorine content of the chlorinated polyolefin will generally range between 15 to 49 percent by weight, while the chlorine content of the chlorosulfonated polyolefin will generally range between 10–35 percent with a sulphur content of less than 5 percent.

Polyolefins with chlorine contents as low as 15 percent can be used to prepare polyvinyl chloride graft copolymers having fair to good impact strengths. On the other hand, chlorine contents above about 49 percent do not serve to further improve physical properties but rather tend to increase the brittleness of the final product. For optimum balance of both tensil and impact properties, the preferred graft copolymer compositions would be those wherein the chlorinated polyolefin has a chlorine content of 23–39 percent by weight and constitutes 3–25 percent by weight of the total product. Chlorinated polyethylene performs exceptionally well within these ranges and is the preferred chlorinated polyolefin. The chlorine and sulfur contents of the chlorosulfonated polyolefins may vary within wide limits. For example, chlorine contents in the range of 10–35 percent, preferably 25–32 percent, and sulfur contents less than 5 percent and preferably 1–2 percent, based on the weight of the cholosulfonated polyolefin, will produce blends having good physical properties. The chlorinated polyethylene may also be prepared by copolymerization of ethylene and vinyl chloride.

The graft copolymer material may be prepared by first dissolving, swelling, or dispersing, the backbone rubber in finely divided condition in vinyl chloride monomer and then polymerizing the vinyl chloride in mass, solution, suspension, or emulsion using conventional free radical producing initiators and polymerization aids.

The polymerization may be accelerated by heat, irradiation and polymerization catalysts. Catalysts which have been found to be useful are monomer-soluble organic peroxides, e.g., benzoyl peroxide, lauroyl peroxide, 2,4-dichlorobenzoyl peroxide, acetyl benzoyl peroxide, t-butyl peroxy pivalate, acetyl cyclohexyl sulfonyl peroxide, or other unsymmetrical peroxides, t-butyl hydroperoxide, alkyl percarbonates, such as isopropyl peroxy percarbonate, perborates, azo compounds, such as azo-isobutyro-nitrile, and mixtures of the same. The quantity of catalyst will generally be varied depending on initiator activity, and on the quantity of monomer and diluent, if any. Polymerization aids such as molecular weight modifiers, solvents suspending agents, particle porosity modifiers, noninhibiting heat stabilizers, emulsifiers, buffers, catalyst activators such as producing agents, non-interfering plasticizers, fillers, pigments, etc., may also be advantageously employed in this regard.

Any of the other ethylenically unsaturated monomers mentioned previously which are to be copolymerized therewith may be added initially with the vinyl chloride, added later during polymerization or slowly bled into the system during polymerization. Additionally, part of the vinyl chloride may be withheld initially and charged as polymerization progresses. Satisfactory results are obtainable both in batch and continuous operations. The reaction products are isolated by conventional means, the details of which depend on the particular polymerization technique employed.

When vinyl chloride is polymerized in the presence of a dissolved chlorinated or chlorosulfonated polyolefin, the resultant product is a mixture of (1) chlorinated and/or chlorosulfonated polyolefin backbone chains with pendant polyvinyl chloride chains, (2) polyvinyl chloride homopolymer, and (3) a small amount of unchanged chlorinated and/or chlorosulfonated polyolefin.

In addition to the primary component of the multicomponent blend, it may also be advantageous to incorporate a vinyl chloride homopolymer prepared by suspension, mass, emulsion, or solution polymerization and having a number average molecular weight of between about 20,000 and 80,000.

The properties of these graft copolymers, as mentioned previously, differ from the properties of a physical blend of polyvinyl chloride with a chlorinated polyolefin, particularly in regard to rigidity, clarity, tensile strength, solvent resistance, heat distortion point, and chemical resistance. The graft copolymers of this invention are also distinguishable from graft copolymers or polyvinyl chloride with polyolefins such as polyethylene and the like. One of the primary distinctions between the graft copolymers of this invention and other graft copolymers is that they tend to compatibilize the other useful components in the multicomponent blends, i.e., the rubbery copolymer of acrylonitrile and a conjugated diene, and the ethylenevinyl acetate copolymer.

The second polymeric ingredient in the multicomponent blend which has been found to impart useful properties to the blend is a copolymer prepared by copolymerizing acrylonitrile with a conjugated diene. Particularly useful in this regard are diolefins such as 1,3-butadiene, 2,3-dimethyl-1,3-butadiene, isoprene, cyclopentadiene, 1,3-hexadiene, etc., and substituted diolefins such as chloroprene, 2-chloro-2,3-butadiene, etc. Butadiene is the preferred diene to employ, but other conjugated dienes having up to six carbon atoms can be used with good results. These acrylonitrile copolymers are normally prepared by copolymerizing the monomers in aqueous emulsion, with or without cross-linking agents such as divinylbenzene, for example. The rubberlike copolymer is generally present in the blend in amounts of 5–50 parts by weight and more preferably in amounts of 20–50 percent by weight of the blend. Proportions outside the above ranges are often found to create problems in regard to compatibility of the blends, resulting generally in undesirable variations in physical properties of the resultant blend.

A third polymeric ingredient which has been found to impart desirable and useful properties to the blend is the class of ethylene-vinyl acetate copolymers described below. These copolymers, which can be prepared by any conventional technique, should have average molecular weights of between 15,000 and 500,000 and more preferably from about 50,000 to 200,000. The ethylene-vinyl acetate copolymers employed in the practice of the invention consist essentially of 15–85 percent by weight of combined ethylene and 85–15 percent by weight of combined vinyl acetate, with optimum physical properties in the multicomponent blend being realized when the vinyl acetate content is between about 25 percent and 50 percent. The ethylene-vinyl acetate copolymer may be present in amounts ranging between 5 and 40 parts by weight, and preferably between 10 and 25 parts by weight of the multicomponent blend.

The following examples are presented to illustrate the novel features of this invention and are not intended to be limitations thereof. Unless otherwise indicated, all quantities mentioned are on a part by weight basis.

*Example I*

A graft copolymer is prepared by charging a clean glass lined reactor having an agitator and fitted with adequate heat transfer means to remove the exothermic heat of polymerization, with 125 parts of purified water, 9.5 parts of 24 percent chlorine content chlorinated polyethylene with a number average molecular weight of 39,000, 0.9 part of epoxidized soybean oil type vinyl plasticizer, 0.2 part sorbitan monolaurate, and 0.15 part of hydroxypropyl methyl cellulose in solution in 20 parts of cool water. Air is evacuated from the reaction vessel. 90.5 parts of vinyl chloride chloride monomer is charged to the reactor and the temperature is adjusted to 57° C. Thirty minutes later, 0.2 part of lauroyl peroxide is flushed into the reactor with water. After eight hours, 92% of the vinyl chloride monomer has been polymerized, and the reaction is terminated by venting off the residual monomer. The aqueous resin slurry is washed and dewatered in a continuous solid bowl centrifuge and the volatile matter then reduced to less than 0.2 percent by passing the moist centrifuge cake through a rotary concurrent hot air drier. 45 parts of the resin is then intimately mixed with 50 parts of a butadiene-acrylonitrile copolymer having 50% acrylonitrile and 5 parts of an ethylene-vinyl acetate copolymer having a vinyl acetate content of 25 percent to produce a multicomponent blend.

*Example II*

A solution of 10 parts chlorinated polyethylene (chlorine content=31.8%, specific viscosity in 0.42% cyclohexanone solution=0.343) in 100 parts vinyl chloride monomer is charged to an air-evacuated pressure vessel containing 160 parts water, 0.30 part hydroxypropyl methyl cellulose (5.5–7.0 hydroxypropyl, 22–23% methoxy content, viscosity of 2% aqueous solution at 20° C.= 1000 cps.) and 0.26 part lauroyl peroxide.

Polymerization is carried out under agitation at 50° C. for 16 hours. After venting off small quantities of unconverted monomer, a homogeneous, granular resin is obtained. The resin is subsequently washed and dried, as in Example I. The dry resin passes 100% through a 40-mesh sieve and has a specific viscosity of 0.583 (0.400 gram in 100 ml. cyclohexanone at 25° C.). 50 parts of the resin is then physically blended with 10 parts of a butadiene-acrylonitrile copolymer containing 20% acrylonitrile, and 40 parts of an ethylene-vinyl acetate copolymer having a vinyl acetate content of 35 percent to produce a composite mixture.

*Example III*

Polymerization is carried out as in Example II, but with solutions of 2 and 40 parts of the same chlorinated polyethylene in 100 parts of vinyl chloride monomer. In both cases homogeneous resins of fine particle size are obtained. 90 parts of the resultant resin are blended with 5 parts of a chloroprene-acrylonitrile copolymer having 20% acrylonitrile and 15 parts of an ethylene-vinyl aceate copolymer having a vinyl acetate content of 55%.

*Example IV*

Polymerization is carried out as in Example II except that 80 parts by weight of vinyl chloride and 20 parts by weight of vinyl acetate are used in place of vinyl chloride. A homogeneous granular resin is obtained. 70 parts of the resin are blended with 20 parts of an isopreneacrylonitrile copolymer having 40% acrylonitrile and 30 parts of an ethylene-vinyl acetate copolymer having a vinyl acetate content of 75 percent.

*Example V*

Polymerization is carried out as in Example I except that chlorinated polypropylene is used in place of chlorinated polyethylene. 60 parts of the resin is admixed with 30 parts of a 2-chloro-2,3-butadiene-acrylonitrile copolymer having 30% acrylonitrile and 10 parts of an ethylene-vinyl acetate copolymer having a vinyl acetate content of 60 percent to produce a composite blend.

*Example VI*

A solution of 15 parts chlorinated polyethylene (15% chlorine) in 10 parts of cyclohexane and 100 parts vinyl chloride monomer is dispersed under agitation in an air-evacuated pressure vessel in 160 parts water containing 0.36 part methyl cellulose as suspending agent and 0.26 part lauroyl peroxide as polymerization initiator. After 16 hours polymerization at 50° C., a homogeneous granular resin having a specific viscosity of 0.453 is obtained. 80 parts of the resin is blended with 15 parts of a cyclopentadiene-acrylonitrile copolymer containing 40% acrylonitrile and 5 parts of an ethylene-vinyl acetate copolymer having a vinyl acetate content of 27 percent.

*Example VII*

Example VI is repeated except that chlorinated polyethylene (49% chlorine) is used in place of chlorinated polyethylene (15% chlorine). Homogeneous granular resins of fine particle size are obtained. 70 parts of the resin are then blended with 20 parts of 2,3-dimethyl-1,3-butadieneacrylonitrile copolymer having 35% acrylonitrile and 10 parts of an ethylene-vinyl acetate copolymer having a vinyl acetate content of 27 percent.

The compositions described in this invention have a relatively broad range of use temperatures and combine exceptional resistance to chemical attack, low moisture absorption, freedom from fungaceous and bacterial attack, absence of fugitive or migrating constituents, resistance to the deleterious effects of prolonged exposure to heat and light, high mutual compatibility of constituents, thus minimizing the defects known as "spew" and "bloom," and low flammability. Hardness, rigidity, dimensional stability, creep resistance, toughness, tensile strength, elongation and tear strength may readily be adjusted over the range associated with semi-rigid and flexible thermoplastics by varying the proportions of the polymeric constituents and liquid plasticizers, if any.

Processing temperatures for the compositions herein described are such that no significant degradation occurs during the overall manufacturing operation.

Typical applications for the flexible materials include wire and cable insulation, non-migratory jacketing for polyethylene primary insulation, fungus resistant underground feeder cable jacketing, film and sheeting for electrical and pressure-sensitive tape, dry-cleanable and washable garments, draperies and upholstery, non-fogging automobile crash pads and upholstery, and pipe-wrap tapes.

Processing aids which may advantageously be incorporated include acrylate rubbers, styrene-acrylonitrile-butadiene terpolymers, styrene-methyl styrene-acrylonitrile terpolymers, styrene-acrylonitrile copolymers, methyl methacrylate polymers, solid aromatic residues from petroleum cracking operations, and so forth.

Liquid plasticizers which are useful in certain of the compositions include phosphate esters such as tricresyl phosphate and tri(2-ethyl hexyl) phosphate, phthalate esters such as di-2-ethyl hexyl and di-tri-decyl phthalate, tetrahydro- and hexahydro-phthalate esters, adipate esters such as di-n-octyl and n-octyl-n-decyl adipate, azelate esters such as di-2-ethyl hexyl azelate, sebacate esters such as di-2-ethyl hexyl sebacate, trimellitate esters, epoxidized soybean oil, epoxidized tall oil, di-epoxidized linseed oil and epoxy stearate plasticizers, complex linear polyesters and polymeric plasticizers, certain citric, acetylcitric, tartaric and ricinoleic acid esters, certain glycol, glycerol and pentra-erythritol esters of fatty acids, and so forth.

Other additives may be used for optimizing the processing performance and/or end use properties of the compositions such as stabilizers, co-stabilizers, anti-oxidants, lubricants, coated and/or uncoated fillers, pigments, light screeners and cross-linking agents or polymerizable plasticizers.

The particular combination of primary ingredients and additives in commercially useful compositions within the range of this invention depends on the specific combination of end use requirements and is varied from one application to another to achieve the optimum overall cost-performance ratio.

The novel multicomponent blend described herein possesses outstanding properties for high grade electrical tape. Tape made from this polymer is characterized by the high stiffness and tensile strength requirements necessary for this type of application, yet the absence of liquid plasticizers, together with excellent brittleness temperature values of nearly minus 30° C. make the material suitable for use over a broad temperature range. In conventional electrical tape formulations, it is generally necessary to sacrifice desirable properties at one end of the temperature spectrum in order to attain the necessary requirements at the opposite end of the temperature range. The novel polymer blend of this invention, however, enables the formulation of tapes having desirable properties at both ends of the temperature spectrum.

Blends prepared in accordance with this invention are also particularly useful in formulations for dry cleanable outerwear garments. Conventional liquid vinyl plasticizers are extracted during a dry cleaning cycle by the perchloroethylene and/or aliphatic cleaning solvent, thereby leaving the film stiff and weak. It is often attempted to overcome this problem by the use of high molecular weight polyester plasticizers; however, the use of these plasticizers generally results in poor low temperature properties. By the use of the multicomponent blends described in this invention, the physical properties of the material are retained, even at low temperatures, and yet no detrimental effects are observed after repeated dry cleaning cycles.

While in the foregoing specification, specific compositions and steps have been set out in considerable detail for the purpose of illustrating the invention, it will be understood that such details of composition and procedure may be varied widely by those skilled in the art without departing from the spirit of this invention.

What is claimed is:

1. A composition of matter comprising: (1) 40–90 parts by weight of a graft blend prepared by polymerizing 60–98% by weight of monomeric material with 2–40% by weight of a chlorinated polymer of an alpha-monoolefin of about 2 to 3 carbon atoms; said monomeric material comprising 80–100% by weight of vinyl chloride and 20–0% by weight of other ethylenically unsaturated monomers copolymerizable therewith, (2) 5–50 parts by weight of a rubberlike copolymer of acrylonitrile and a conjugated diene having an acrylonitrile content of between about 20–50 percent by weight and (3) 5–40 parts by weight of an ethylene-vinyl acetate copolymer.

2. A composition according to claim 1 wherein the chlorinated polyolefin has a chlorine content of 15–49% by weight.

3. A composition according to claim 1 wherein said ethylene-vinyl acetate copolymer has a vinyl acetate content of between about 15–85% by weight of the copolymer.

4. A composition according to claim 1 wherein the rubberlike copolymer is a butadiene-acrylonitrile copolymer.

5. A composition according to claim 1 wherein the chlorinated polyolefin is chlorinated polyethylene.

6. A composition according to claim 1 wherein said graft blend is present in amounts of 50–60 parts by weight, said rubberlike copolymer of a conjugated diene and acrylonitrile is present in amounts of 25–40 parts by weight, and said ethylene-vinyl acetate copolymer is present in amounts of 10–25 parts by weight.

7. A composition according to claim 5 wherein said chlorinated polyethylene used in the preparation of the graft blend has a number average molecular weight of between about 10,000 to 100,000.

8. A composition of matter comprising: (1) 40–90 parts by weight of a graft blend prepared by polymerizing 60–98% by weight of a monomeric material with 2–40% by weight of a chlorosulfonated polymer of an alpha-monoolefin of about 2 to 3 carbon atoms; said monomeric material comprising 80–100% by weight of vinyl chloride and 20–0% by weight of other ethylenically unsaturated monomers copolymerizable therewith, (2) 5–50 parts by weight of a rubberlike copolymer of acrylonitrile and a conjugated diene having an acrylonitrile content of between about 20–50 percent by weight and (3) 5–40 parts by weight of an ethylene-vinyl acetate copolymer.

9. A composition according to claim 8 wherein said chlorosulfonated polyolefin is chlorosulfonated polyethylene.

10. A solvent resistant tank lining produced from a composite thermoplastic mixture, said mixture comprising: (1) 40–90 parts by weight of a graft blend prepared by polymerizing 60–98% by weight of monomeric material with 2–40% by weight of a chlorinated polymer of an alpha-monoolefin of about 2 to 3 carbon atoms; said monomeric material comprising 80–100% by weight of vinyl chloride and 20–0% by weight of other ethylenically unsaturated monomers copolymerizable therewith, (2) 5–50 parts by weight of a rubberlike copolymer of acrylonitrile and a conjugated diene having an acrylonitrile content of between about 20–50 percent by weight and (3) 5–40 parts by weight of an ethylene-vinyl acetate copolymer.

11. A process for preparing a multicomponent blend of thermoplastic polymeric material useful in the production of low cost flexible and semi-rigid products comprising the steps of preparing a graft blend by polymerizing 60–98% by weight of a monomeric material with 2–40% by weight of a chlorinated polymer of an alpha-monoolefin of about 2 to 3 carbon atoms; said monomeric material comprising 80–100% by weight of vinyl chloride and 20–0% by weight of other ethylenically unsaturated monomers copolymerizable therewith; and blending therewith, 5–50 parts by weight of a rubberlike copolymer of acrylonitrile and a conjugated diene having an acrylonitrile content of between about 20–50 percent by weight together with 5–40 parts by weight of an ethylene-vinyl acetate copolymer.

12. A process according to claim 11, wherein the rubberlike copolymer is a butadiene-acrylonitrile copolymer.

References Cited by the Examiner

UNITED STATES PATENTS 3,085,082   4/1963   Baer et al. _____ 260—876

FOREIGN PATENTS 626,534   8/1961   Canada.

MURRAY TILLMAN, *Primary Examiner.*

G. F. LESMES, *Assistant Examiner.*